United States Patent [19]

Hoover et al.

[11] Patent Number: 4,967,482
[45] Date of Patent: Nov. 6, 1990

[54] SUPPORT BRACKET APPLICABLE TO MEASURING TOOLS

[75] Inventors: Donald L. Hoover, Akron; Ronald J. Rengle, Cuyahoga Falls, both of Ohio

[73] Assignee: Future Line Incorporated, Akron, Ohio

[21] Appl. No.: 517,750

[22] Filed: May 2, 1990

[51] Int. Cl.⁵ .............................. G01B 3/10
[52] U.S. Cl. ....................... 33/760; 33/427; 33/484; 33/42
[58] Field of Search ............... 33/759, 760, 761, 768, 33/770, 42, 484–487, 489–492, 480, 479, 474, 1 G, 1 F, 427, 429

[56] References Cited

U.S. PATENT DOCUMENTS

| 2,571,569 | 10/1951 | Greenwood | 33/484 |
| 3,095,651 | 7/1963 | Luedicke | 33/760 |
| 3,181,242 | 5/1965 | Cook | 33/761 |
| 3,812,587 | 5/1974 | Elkins et al. | 33/760 |
| 4,200,984 | 5/1980 | Fink | 33/427 |
| 4,227,314 | 10/1980 | Schliep | 33/484 |
| 4,642,898 | 2/1987 | Miller | 33/768 |

Primary Examiner—William A. Cuchlinski, Jr.
Assistant Examiner—Alvin Wirthlin
Attorney, Agent, or Firm—L. A. Germain

[57] ABSTRACT

A support bracket has a base member adapted for attachment to a particular measuring tool and a vertical member extends from the base member and it has a horizontal slot within its top edge which mounts a tape rule by way of the tape rule spring clip. The tape rule is oriented on the support bracket such that measurements may be made along a common baseline with reference to the measuring tool and a workpiece to be measured while, at the same time, measurements may also be made along a ruler edge of the measuring tool which is positioned at an angle with respect to the common baseline.

14 Claims, 3 Drawing Sheets

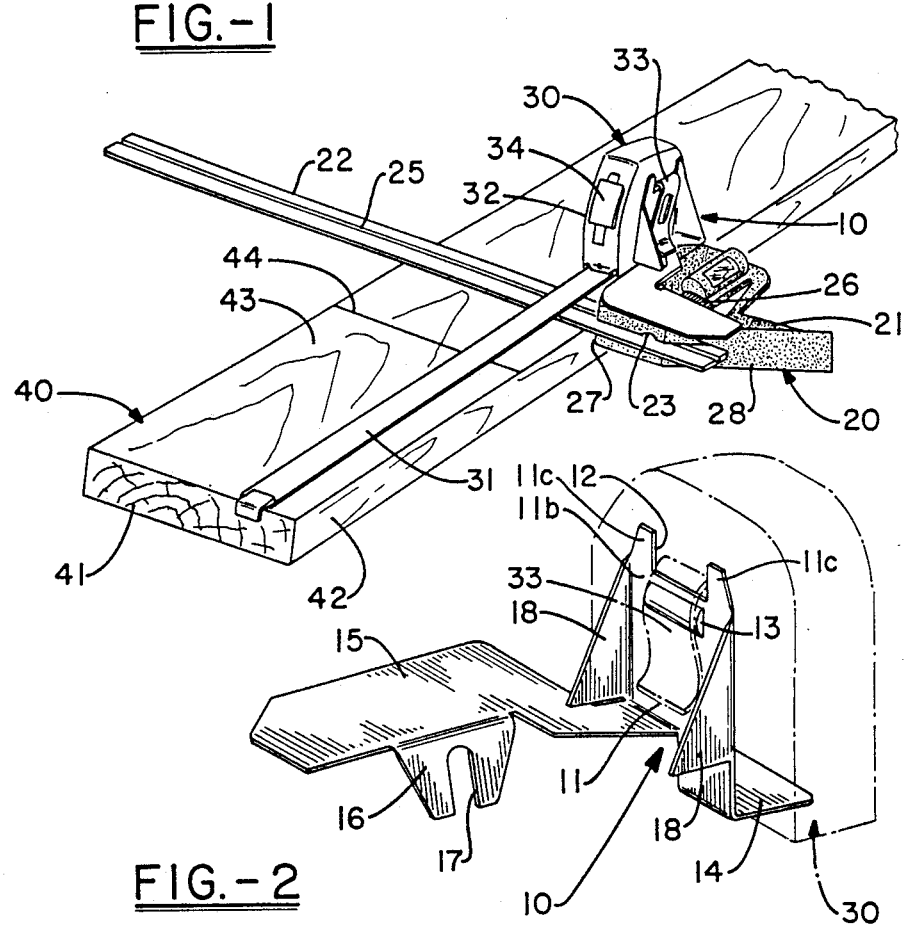
FIG.-1
FIG.-2
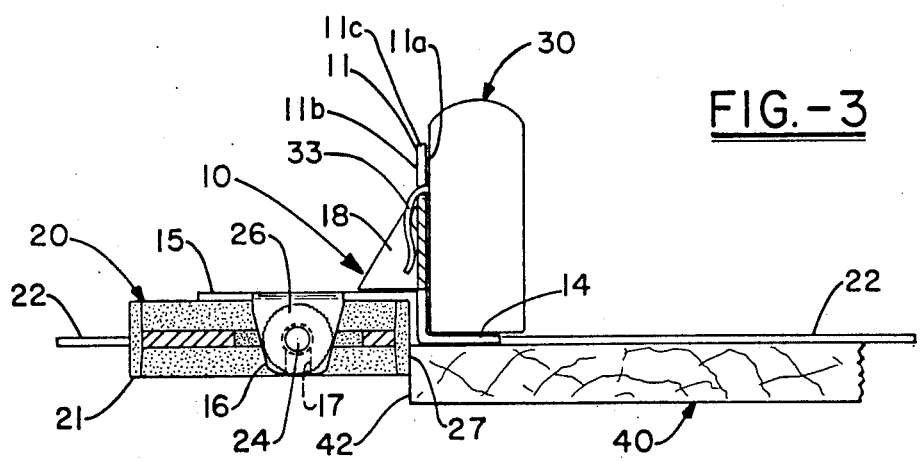
FIG.-3

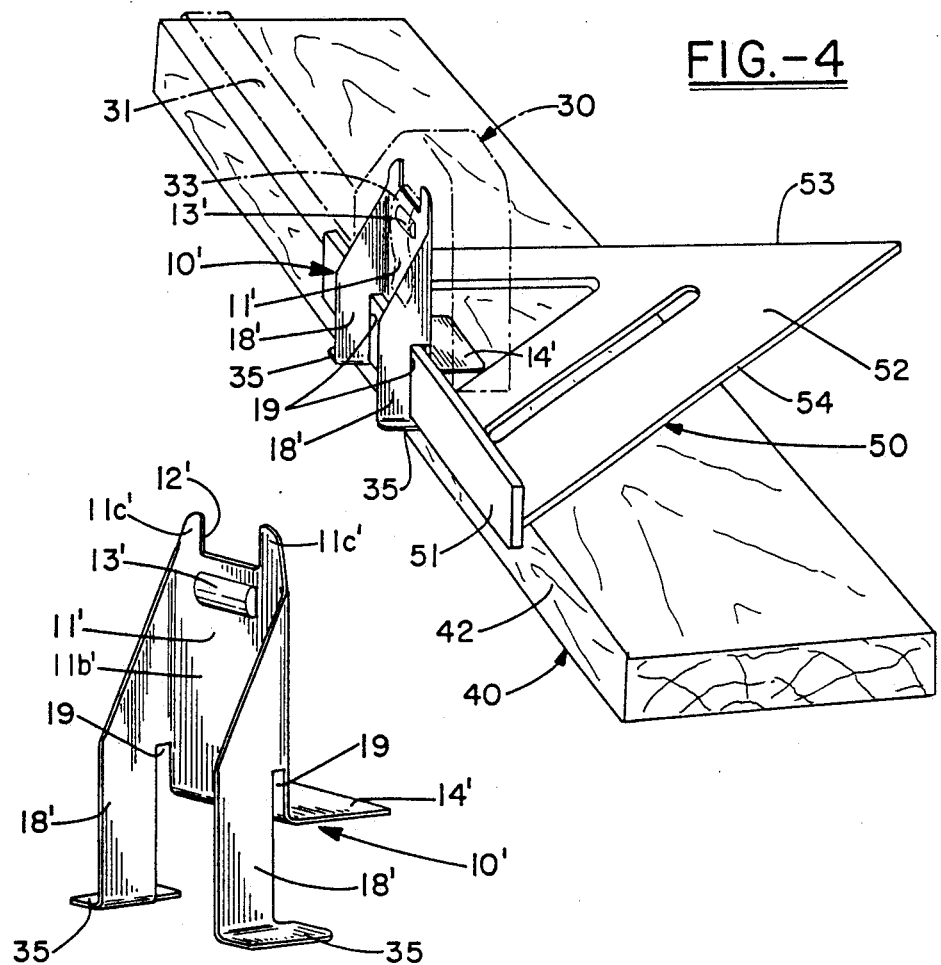
FIG.-4
FIG.-5
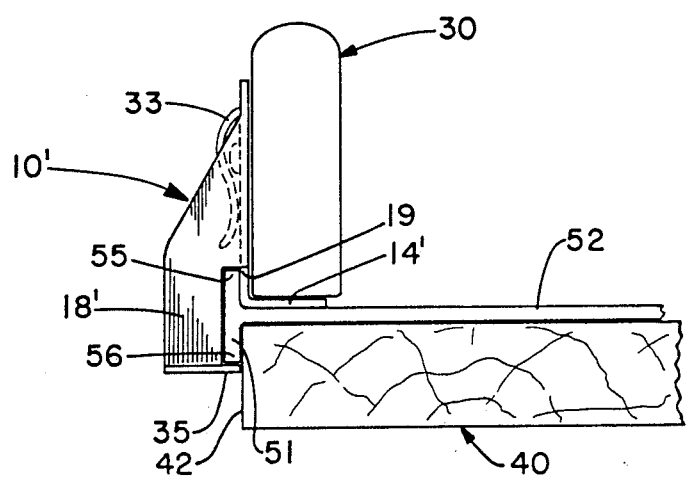
FIG.-6

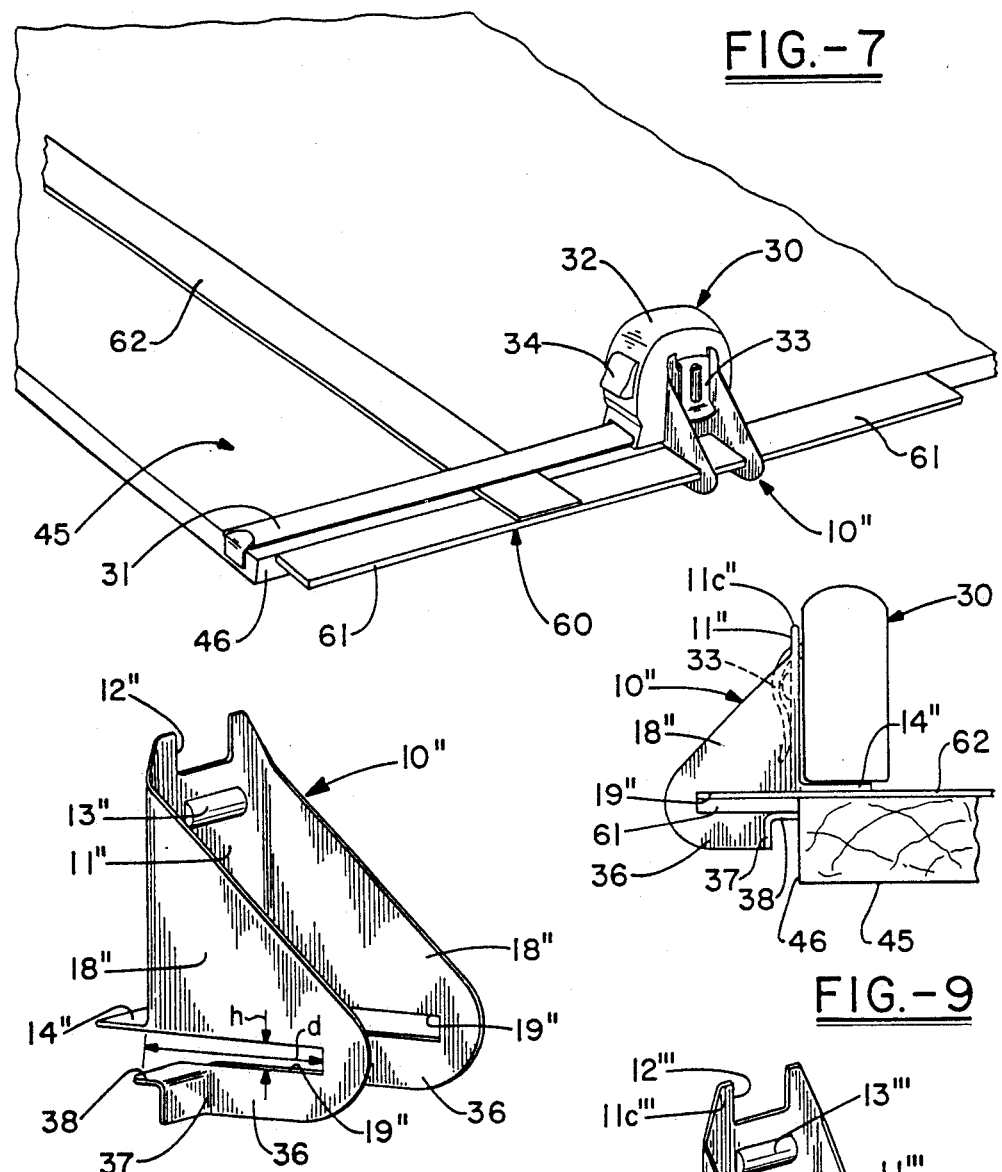
FIG.-7
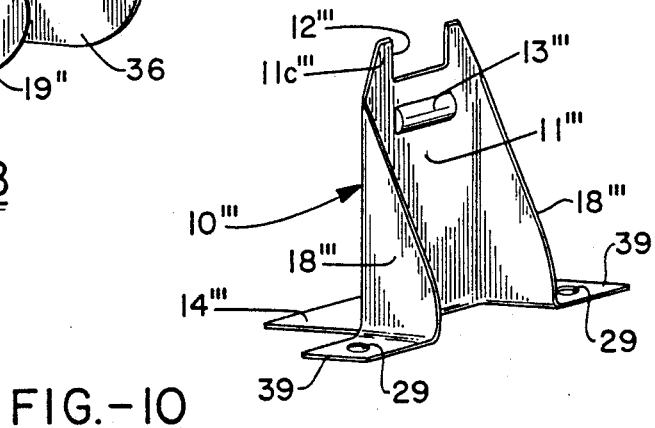
FIG.-8
FIG.-9
FIG.-10

SUPPORT BRACKET APPLICABLE TO MEASURING TOOLS

BACKGROUND OF THE INVENTION

The present invention generally pertains to tools as may be used for measuring lengths. More particularly, the present invention pertains to bracket configurations which are attachable to various conventional measuring tools to facilitate combining the advantages of a particular tool with the advantages which may be found in a conventional tape rule.

Specifically, the present invention provides a support bracket which will allow one to mount a tape rule on another type of measuring tool to effectively measure a length along a common baseline of the measuring tool and a workpiece while, at the same time, to measure along a line which is angular to the common baseline.

In the carpentry trade and other similar trades, one must frequently make multiple measurements along a common baseline and thereafter scribe and/or measure along a line which is angular to the baseline where the material being worked on will be cut into multiple lengths. For example, if a carpenter wishes to cut an eight-foot long board into four two-foot lengths, he will usually measure off the four two-foot divisions along the lineal length of the board using a tape rule or other similar tool. He will then use a right angle square to scribe a line which is orthogonal to the baseline edge of the board where the multiple cuts will be made. It should be obvious that this operation requires two specific steps using two different measuring tools prior to actually cutting the board into the desired lengths. It would be most advantageous if the carpenter could combine both measuring operations into one step. This would result in a savings of time over a period when he may be required to make many more of the same type of measurement.

SUMMARY OF THE INVENTION

It is in accordance with one aspect of the present invention an object to provide a means which effectively combines two measuring operations into a single operation.

In accordance with another aspect of the invention it is an object to provide a means for effectively combining the advantages of a particular type of measuring tool with the advantages of a tape rule to obtain two measurements of a workpiece at the same time, one measurement being taken along a common baseline of the measuring tool and the workpiece while the other measurement is taken at an angle with respect to the baseline.

In accordance with still another aspect of the invention it is an object to provide a support bracket which is attachable to a particular measuring tool to mount a tape rule in an orientation relative to the tool baseline such as to obtain a measurement along the baseline while, at the same time, providing measurements along a line which is angular with respect to the baseline.

In accordance with another aspect of the invention it is an object to provide a support bracket which may be fabricated from various suitable materials and in a configuration for attachment to a particular measuring tool such as to mount a conventional tape rule on the measuring tool by way of the tape rule spring clip and in an orientation to facilitate measurements along a common baseline while also providing measurements which may be orthogonal to the baseline.

These and other aspects and advantages of the present invention are provided in a support bracket comprising a base member adapted for attachment to a particular measuring tool and, a vertical member extending from the base member which has a horizontal slot in its topmost edge for mounting of a tape rule by way of the tape rule spring clip, the vertical member providing an orientation of the tape rule on the measuring tool such that measurements may be taken along a common baseline of the measuring tool and an workpiece while, at the same time, the measuring tool provides measurements along a line which is angular with respect to the baseline.

BRIEF DESCRIPTION OF THE DRAWINGS

The features and advantages of the present invention will best be appreciated and understood with reference to the detailed description which follows when taken in conjunction with the accompanying drawings, in the several figures of which like reference numerals identify like elements or member and the primed, double-primed, and triple-primed numerals are like elements or members of the unprimed numerals and in which:

FIG. 1 is a perspective view showing a first embodiment of the invention in the form of a support bracket which may be applied to combining the advantages of a carpenter's adjustable square with the advantages of a tape rule;

FIG. 2 is a perspective view of the support bracket shown in FIG. 1 illustrating various of its features and a relationship with a conventional tape rule which is shown in dot-dashed ghost lines;

FIG. 3 is an elevational view, partially broken away and in cross-section, of the combined adjustable square, the support bracket, and the tape rule in relative position on a workpiece;

FIG. 4 is a perspective view illustrating a second embodiment of the invention as it may be applied to combining the advantages of a carpenter's rafter square and a tape rule;

FIG. 5 is a perspective view of the support bracket shown in FIG. 4;

FIG. 6 is an elevational view of the combined rafter square, support bracket, and tape rule in relative position on a workpiece;

FIG. 7 is a perspective view illustrating a third embodiment of the invention as it may be applied to combining the advantages of a carpenter's panel T-square with the advantages of a conventional tape rule;

FIG. 8 is a perspective view of the support bracket shown in FIG. 7 illustrating various of its features;

FIG. 9 is a side elevational view of the panel T-square, support bracket, and the tape rule as these are combined in relative position of a workpiece; and FIG. 10 is a perspective view of the inventive support bracket in a configuration which may be fastened to various of the conventional measuring tools.

DETAILED DESCRIPTION OF THE INVENTION

Referring to the drawings, FIG. 1 illustrates an application of the invention wherein the advantages of a conventional carpenter's adjustable square are combined with the advantages inherent in a conventional tape rule. The invention comprises a support bracket generally indicated by reference numeral 10, the bracket 10 being carried on an adjustable square 20 in a manner to mount a tape rule 30 thereon such that two different measurements may be made at the same time along a lineal length of a workpiece 40, having at least one terminal end 41. The workpiece 40 may obviously be any type of material but, for the purpose of this description, it is illustrated as a section of wooden board.

A carpenter's adjustable square 20 conventionally includes a main body or baseline portion 21 comprised of a suitable metal, the body having various angles ie., 45° and 90° incorporated into its design configuration. A ruler 22 is slidably received within a slot 23 formed in the baseline portion 21 and it is movable within the slot or maintained in a fixed position by means of a bolt 24 (shown in FIG. 3). The bolt 24 is characterized by a transverse key piece in the end (not shown) which rides in a longitudinal groove 25 in the surface of the ruler 22. The ruler 22 may be fixed in any position by tightening up of a knurled nut 26 which is threadably carried on the opposite end of the bolt 24. It may be appreciated that the orientation of the slot 23 allows one to measure either 45° or 90° angles with respect to the baseline member 21 by merely positioning the ruler 22 in either direction within the slot 23. For example and as illustrated in FIG. 1, an edge surface 27 is provided on the baseline member 21 which forms a 90° angle with respect to the ruler 22 and the surface 27 is adapted to ride on and along the lineal edge surface 42 of the workpiece in this manner, one may scribe a line 44 which is angular, or more precisely, orthogonal to the baseline edge 42. Of course, an additional edge surface 28 is also provided on the baseline member 21 and this surface is at a 45° angle with respect to the ruler 22. When the edge surface 28 is positioned to ride along the lineal edge of the workpiece, one may scribe and/or measure along a line which is at 45° relative to the baseline.

A conventional tape rule 30 may be had in various sizes and this depends upon the length of tape 31 which must be carried within the tape rule housing 32. Many tape rules 30 which are used in the trades also include a belt spring clip 33. The spring clip 33 allows one to carry the tape rule on his person so that it is always available when measurements are to be made. Additionally, a tape rule 30 may include a tape stop 34 which functions to hold the tape 31 at an extended length position. Usually, the larger tape rules have a spring-loaded tape 31 and the tape stop 34 is used to keep the tape from springing back into the housing 32 when a measurement is being made.

As illustrated in FIG. 1, a tape rule 30 is mounted on the support bracket 10 which is secured to the adjustable square 20. The support bracket 10 carries the tape rule 30 by way of the belt spring clip 33 which orientates the tape rule in a substantially orthogonal direction with respect to the ruler 22. In other words, when the tape 31 is drawn out of the housing 32, it is aligned along the common baseline as such exists between the baseline member 21 of the measuring tool 20 and the lineal edge 42 of the workpiece 40. In this manner, one may mark off any measurement along the lineal length of the workpiece 40 while, at the same time, measure along a line 44 which is angular and on the surface 43 of the workpiece.

Referring now to FIGS. 2 and 3, the various features of the support bracket 10 are illustrated. The support bracket 10 comprises a vertically oriented member 11 which has planar side faces 11a and 11b and a slot 12 is formed in its topmost edge for a substantial portion of the top edge length. The slot 12 functions to carry a belt spring clip 33 of a tape rule 30 such that it cannot move horizontally off of the support bracket by reason of posts 11c which are formed at the ends of the slot 12. Further, the vertical member 11 may include a horizontally aligned dimple 13 which is formed into the planar surface 11b and it functions to keep the tape rule 30 from moving vertically off of the support bracket. The support bracket 10 is also characterized by a base end having a horizontal extension member 14 which is at a right angle with respect to the planar face 11a of the vertical member 11. While it can be seen that the member 14 will aid in supporting a tape rule 30 on its upper surface, it will also function to limit how far down on the vertical member 11 a tape rule may move. This limits any interference of the tape rule with the normal operation of the adjustable square 20. Also, it should be evident from the showing of FIGS. 1 and 3, that the operational level of a tape 31 will always be slightly above the level of the ruler 22 and one will not interfere with the operation of the other.

The base end of the support bracket 10 is further characterized by a second member 15 which extends horizontally from the opposite planar face 11b of the vertical member 11 such as to be supported on the surface of the baseline member 21 of the adjustable square 20. While the member 15 does provide support for the bracket 10, it also provides a locking arrangement by means of a vertically depending member 16. The member 16 has a slot 17 for a substantial portion of its length and, as shown in FIG. 3, the member 16 is interposed on the bolt 24 between the adjusting nut 26 and the body of the baseline portion 21. Thus, when the knurled nut 26 is tightened down on the bolt 24, it effects a clamping action of the depending member 16. In this manner, the support bracket 10 may be locked onto the adjustable square 20.

The support brackets of this invention may be comprised of various type materials and it is not a limitation of the invention as to what type of material is used in fabricating a support bracket. For example, a support bracket may be stamped and/or formed out of a suitable sheet metal material. Further, a support bracket may be formed of a suitable plastic material by various known methods and techniques. Regardless of the type of material used in the construction of a support bracket, such bracket may be configured to include a pair of vertically oriented support braces 18 which will aid in supporting the vertical member 11 when larger and heavier tape rules 30 are mounted on it. Obviously, the type of material used, its structural strength, and its gauge thickness will dictate whether or not such brace members 18 are to be configured into the support bracket design.

Referring now to FIGS. 4-6 of the drawings, a second embodiment of the invention is illustrated as it may be applied to combining the advantages of a conventional carpenter's rafter square with the advantages of a conventional tape rule. A support bracket, generally indicated by reference numeral 10', is shown as it may be carried on a carpenter's rafter square 50 in a manner to mount a tape rule 30 thereon such that two measurements may be made at the same time along a lineal length of a workpiece 40. The rafter square 50 conventionally comprises a baseline member 51 which is used in much the same manner as described with respect to the adjustable square 20. Extending horizontally from the baseline member 51 is a substantially triangular member 52 which is characterized by one side 53 being at a 90° angle with respect to the baseline member 51 while a second side 54 is at a 45° angle with respect to the baseline member 51. Obviously, the rafter square 50 may be used to obtain measurements in much the same manner as the adjustable square 20.

The support bracket 10' is very similar to the support bracket 10 described hereinbefore except that the bracket 10' has a base end which is characterized by vertically depending legs 18'. The legs 18' are lower extensions of the vertical brace members 18 and each defines a slot 19 which is adapted to carry the baseline member 51 of the rafter square in a seated and substantially force-fit engagement. This is accomplished by reason of horizontally extending ends of the legs 18' which are indicated in the drawing at reference numerals 35. It may be appreciated that the baseline member 51 of the rafter square may be fitted into the slots 19 by engaging the upper edge 55 of the baseline member into the upper end of the slots 19 and then rotating the lower edge 56 of the baseline member toward the slots 19 such as to engage the horizontal extensions 35 which will function to lock the baseline member 51 into the slots 19. Clearly, the tape rule mounting orientation on the support bracket 10' will facilitate measuring lengths along the baseline member 51 and thus also the lineal edge of the workpiece 40 in substantially the same manner as was achieved with the embodiment 10 of FIGS. 1-3.

FIGS. 7, 8 and 9 of the drawings illustrate a third embodiment of the invention wherein a support bracket is generally indicated by reference numeral 10". The support bracket 10" combines the advantages of a conventional carpenter's panel T-square 60 with the advantages found in a conventional tape rule 30. This combination facilitates making measurements in at least two orthogonal directions at the same time with respect to a common baseline 46 of a workpiece 45. The workpiece 45 comprises a large panel of material such as, for example, a drywall panel or a plywood panel in the standard sizes of such materials. Obviously, the panel 45 may comprise any other material as used by the building trades and/or any of the other trades. In any event, the support bracket 10" is secured to the baseline member 61 of the T-square 60 so as to mount a conventional tape rule 30 thereon in a manner such that measurements may be made along the tape 31 which is oriented parallel to the common baseline 46 of the workpiece 45.

The support bracket 10" is very similar to the support brackets 10 and 10' hereinbefore described except that the bracket 10" has a base end which is characterized by a pair of vertically extending ends 36 of the leg braces 18". These extensions define a pair of slots 19" which are oriented horizontally with respect to the vertical member 11" and each slot 19" is characterized by a height "h" which is substantially the thickness of the T-square baseline member 61 and a depth "d" which is substantially the width of a standard T-square at its baseline 61. In this configuration, the support bracket 10" has a force-fit engagement with the baseline member 61 so as to be easily maintained thereon without fear of its falling off of the T-square when it is being used. Further, it should be appreciated that the vertical brace members 18" may be used as finger-holds which will facilitate moving the T-square along the baseline edge 46 of the workpiece piece and that the closed ends of the slots 19" will function to hold and to force the T-square baseline member 61 against the lineal edge surface of the workpiece.

In addition to the above-mentioned configuration, the support bracket 10" may have the slot-forming depending ends 36 bent at a right angle at 37 which includes horizontally extending foot members 38. Referring to FIG. 9 of the drawings, it can be seen that the horizontal extensions of each foot member 38 extends the defined slots 19" to the exact width extent of the baseline member 61. Thus, each member 38 adds a flat horizontal surface to the underside of the baseline member 61 which will aid in supporting it while also providing a baseline following edge which will ride on the surface 46 of the workpiece 45.

Finally, FIG. 10 illustrates a support bracket 10"' which is similar to the previously described support brackets 10, 10', and 10" except that the base end is characterized by a pair of horizontally extending members 39 which are merely extensions of the vertical braces 18"'. The vertical brace members 18"' are bent at a right angle and, in this configuration, the members 39 may be fastened in either a permanent or a semi-permanent manner to the particular measuring tool. Holes 29 are provided for this purpose and, of course, any type of fastener such as a rivet, screw, bolt and the like may be used for this purpose in mounting of the support bracket 10"'.

While certain representative embodiments and details of the invention have been shown for the purpose of illustrating the invention, it will be apparent to those skilled in the art relating thereto, that various changes and modifications may be made therein without departing from the spirit or scope of the invention.

What is claimed is:

1. A support bracket adapted for attachment to a measuring tool wherein said measuring tool is characterized by a baseline member and a ruler extending horizontally from the baseline member and having ruler edges which are angular with respect to the baseline member, said support bracket also adapted for until a tape rule by means of a tape rule belt spring clip, the support bracket comprising;

a base member attached to the baseline member of the measuring tool; and a member extending vertically from the base member and having opposite planar side faces defined by vertical end edges and a top edge having an open horizontal slot for a substantial portion of the top edge length, which slot is terminated short of the junctures of the top edge with either of the vertical end edges to form a pair of posts;

said tape rule being mounted on the vertical member by its spring clip being carried within the horizontal slot and oriented with respect to the baseline member of the measuring tool such as to facilitate measurements along a line which is parallel to the baseline member while, at the same time, additional measurements may be made along a ruler edge of the measuring tool.

2. A support bracket as set forth in claim 1 wherein the measuring tool comprises a carpenter's adjustable square.

3. A support bracket as set forth in claim 2 wherein the base member is characterized by a first member extending substantially horizontally away from a first planar side face of the vertical member and a second member extending substantially horizontally away from the opposite planar side face of the vertical member, the first member providing a support surface for a tape rule carried on the vertical member while said second member provides support for the bracket on the surface of the baseline member of the adjustable square, said second member having a vertically depending portion which has a slot in engagement with an adjusting nut and bolt of the adjustable square, said depending portion interposed between the baseline member and the adjusting nut so as to be clamped therebetween when the adjusting nut is tightened down on the bolt.

4. A support bracket as set forth in claim 3 wherein the vertical member is further characterized by a horizontal dimple formed in the planar side face of the material comprising the support bracket, and in a planar side face in the vertical member below the horizontal slot in the top edge, said dimple providing a vertical stop for the tape rule spring clip such that said tape rule cannot move easily off of the vertical member.

5. A support bracket as set forth in claim 4 wherein the vertical member further comprises a vertical brace member extending at a right angle from each vertical end edge with respect to the opposite planar side face of the vertical member.

6. A support bracket as set forth in claim 1 wherein the measuring tool comprises a carpenter's rafter square.

7. A support bracket as set forth in claim 6 wherein the vertical member also comprises a vertical brace member extending at a right angle from each vertical end edge and the base member is characterized by a member extending horizontally from a first planar side face of the vertical member to provide a supporting surface for a tape rule mounted on the vertical member and each of said vertical brace members defines a vertical slot dimensioned to accept the baseline member of the rafter square in a seated and substantially force-fit engagement.

8. A support bracket as set forth in claim 7 wherein each of said vertical brace members further comprise a terminal end formed to a right-angled foot extension which provides a supporting surface for a bottom edge of the baseline member of the rafter square.

9. A support bracket as set forth in claim 1 wherein the measuring tool comprises a carpenter's panel T-square.

10. A support bracket as set forth in claim 9 wherein the vertical member comprises a vertical brace member extending at a right angle from each of said vertical end edges and the base member is characterized by a member which extends horizontally from a planar side face of the vertical member to provide a supporting surface for a tape rule mounted on the vertical member, each of said vertical brace members defining a horizontally aligned slot dimensioned to accept the baseline member of the panel T-square in a seated engagement.

11. A support bracket as set forth in claim 10 wherein each of said vertical brace members which define the horizontal slot is characterized by a terminal end portion which is bent at a right angle to the plane of the brace member, said terminal end portion having a right-angled horizontal extension which terminates at a point defined by a line drawn vertically from a planar side face of the vertical member.

12. A support bracket as set forth in claim 11 wherein the vertical member is further characterized by a horizontal dimple formed in the material comprising the support bracket and in a planar side face of the vertical member below the horizontal slot in the top edge, said dimple providing a stop for the tape rule spring clip such that said tape rule cannot move easily vertically off of the vertical member.

13. A support bracket as set forth in claim 1 wherein the base member comprises a member extending horizontally from a planar side face of the vertical member to provide a supporting surface for the tape rule mounted on the vertical member, said vertical member also comprising a vertical brace member extending at a right angle from each vertical end edge and from the opposite planar side face and each said brace member having a terminal end bent at a right angle with respect to the plane of the brace and each said terminal end comprising a means to fasten said terminal end to the baseline member of the measuring tool.

14. The support bracket as set forth in claim 13 wherein the vertical member is characterized by a horizontal dimple formed in the material comprising the support bracket and in a planar side face of the vertical member below the horizontal slot formed in its top edge to provide a stop for a tape rule spring clip preventing said tape rule from moving vertically off of the vertical member

* * * * *

UNITED STATES PATENT OFFICE
CERTIFICATE OF CORRECTION

Patent No. 4,967,482  Dated November 6, 1990

Inventor(s) Donald L. Hoover and Ronald J. Rengle

It is certified that error appears in the above-identified patent and that said Letters Patent is hereby corrected as shown below:

Column 6, at line 38, "until" should read ---mounting---.

Signed and Sealed this

Tenth Day of March, 1992

*Attest:*

HARRY F. MANBECK, JR.

*Attesting Officer*  *Commissioner of Patents and Trademarks*